US005674049A

United States Patent [19]
Pienta et al.

[11] Patent Number: 5,674,049
[45] Date of Patent: Oct. 7, 1997

[54] ROLL HANDLING APPARATUS

[75] Inventors: David J. Pienta, Lambertville; Earl E. McHenry, Blissfield, both of Mich.

[73] Assignee: Automatic Handling, Inc., Erie, Mich.

[21] Appl. No.: 541,403

[22] Filed: Oct. 10, 1995

Related U.S. Application Data

[63] Continuation-in-part of Ser. No. 261,711, Jun. 17, 1994, Pat. No. 5,533,859.
[51] Int. Cl.⁶ .................................................. B65G 59/00
[52] U.S. Cl. ................... 414/798.7; 414/910; 414/390; 414/679; 414/572
[58] Field of Search ..................... 414/27, 352, 353, 414/373, 374, 340, 341, 342, 572, 679, 395, 788, 798.2, 907, 908, 910, 911, 798.7

[56] References Cited

U.S. PATENT DOCUMENTS

| | | |
|---|---|---|
| 2,841,300 | 7/1958 | Berquist .................. 414/607 |
| 2,841,301 | 7/1958 | Sherriff .................... 414/607 |
| 3,680,492 | 8/1972 | Weege ..................... 414/679 |
| 3,730,368 | 5/1973 | Dalglish ................... 414/911 |
| 3,734,328 | 5/1973 | Dalglish ................... 414/620 |
| 3,884,369 | 5/1975 | Tomlinson ................. 414/27 |
| 4,154,470 | 5/1979 | Dalglish ................... 414/911 |
| 4,358,143 | 11/1982 | Cullen ..................... 414/911 |
| 4,367,059 | 1/1983 | Stubbins ................... 414/911 |
| 4,687,244 | 8/1987 | Cullen et al. .............. 414/911 |
| 4,708,574 | 11/1987 | Corboy et al. ............. 414/908 |
| 4,838,752 | 6/1989 | Bryant ..................... 414/607 |
| 5,333,988 | 8/1994 | Turra et al. ............... 414/908 |
| 5,340,260 | 8/1994 | Turro et al. ............... 414/27 |
| 5,480,279 | 1/1996 | Stauber .................... 414/626 |
| 5,562,385 | 10/1996 | Tacchi et al. ............. 414/391 |

Primary Examiner—Karen B. Merritt
Assistant Examiner—Gregory A. Morse
Attorney, Agent, or Firm—Emch, Schaffer, Schaub & Procello Co., L.P.A.

[57] ABSTRACT

A roll handling apparatus, including a roll handling cart, a C-hook assembly and a tiltable upender assembly is disclosed. The roll handling cart receives a plurality of spaced rolls, for example, paper rolls. A guide moves the cart bed along a path. A first member engages one end of the rolls and a second member engages the other end to move the rolls adjacent one another.

10 Claims, 7 Drawing Sheets

FIG. 9

ROLL HANDLING APPARATUS

DESCRIPTION

The present application is a continuation-in-part of my application Ser. No. 08/261,711 filed Jun. 17, 1994, now U.S. Pat. No. 5,533,859.

BACKGROUND OF THE INVENTION

The present invention is directed to roll handling apparatus and more specifically to a roll handling apparatus which quickly and easily transports and sorts rolls for redistribution, either at the same location or to remote locations.

Various materials, such as paper and soft metals, are slit and placed in rolls at a roll converting stations. It has been found that the materials within the rolls are sometimes damaged if, for example, the rolls are rolled on their circumferences. A common delivery system for rolls is to vertically align them in groups on a pallet and then transport the pallets to remote locations, where the individual rolls are removed and used. It is important that the rolls be quickly and adequately aligned.

SUMMARY OF THE INVENTION

The present invention is directed to a roll handling apparatus which includes a cart having a bed for receiving a plurality of spaced rolls, for example, paper rolls. A guide is provided for moving the cart bed along a predetermined path. A first member is mounted adjacent the guide for engaging the first one of the plurality of spaced rolls and a second member is mounted in opposed relationship for engaging the opposite end of the spaced rolls. Relative movement between the members position the spaced rolls closely adjacent one another.

An elevated support rail is mounted parallel to the guide and a C-hook assembly is mounted for movement along an elevated support rail system. A vertically moveable lifting arm extends downwardly from the elevated support rail system and a C-shaped lifting hook is mounted adjacent the lower end of the lifting arm.

A tiltable upender assembly is located adjacent the support rail system. The C-shaped lifting hook supports the rolls for movement to the tiltable upender assembly.

The upender assembly includes a frame, a deck assembly adjacent the frame and a rear carrier assembly extending perpendicular to the deck assembly. The deck assembly and the rear carrier assembly are rotatable 90° relative to the frame about a first axis. The deck assembly is also tiltable about a second axis which is substantially perpendicular to the first axis.

DETAILED DESCRIPTION OF THE PREFERRED EMBODIMENTS

Figure 1:
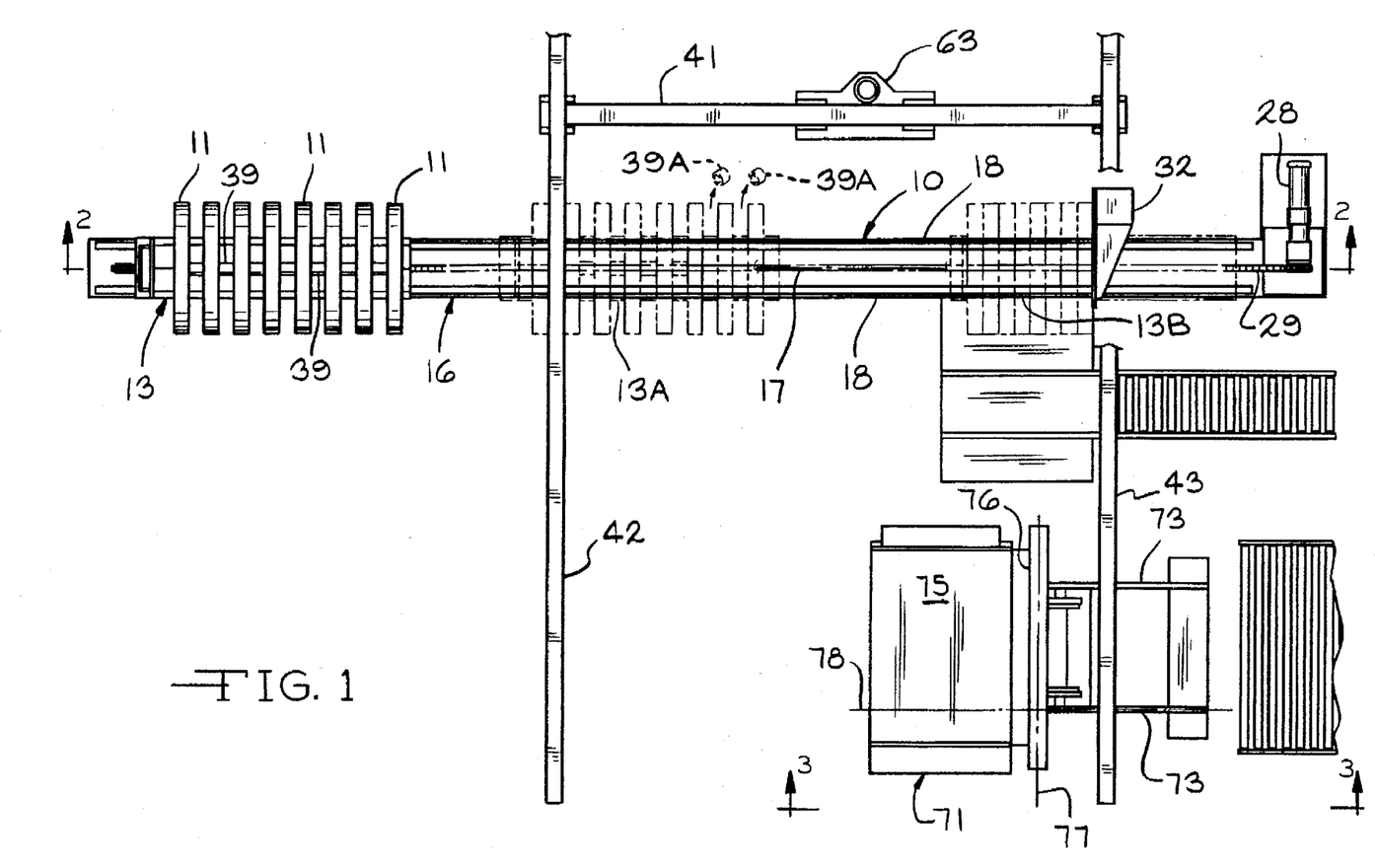
FIG. 1 is a plan view of roll handling apparatus, according to the present invention.
Figure 6:
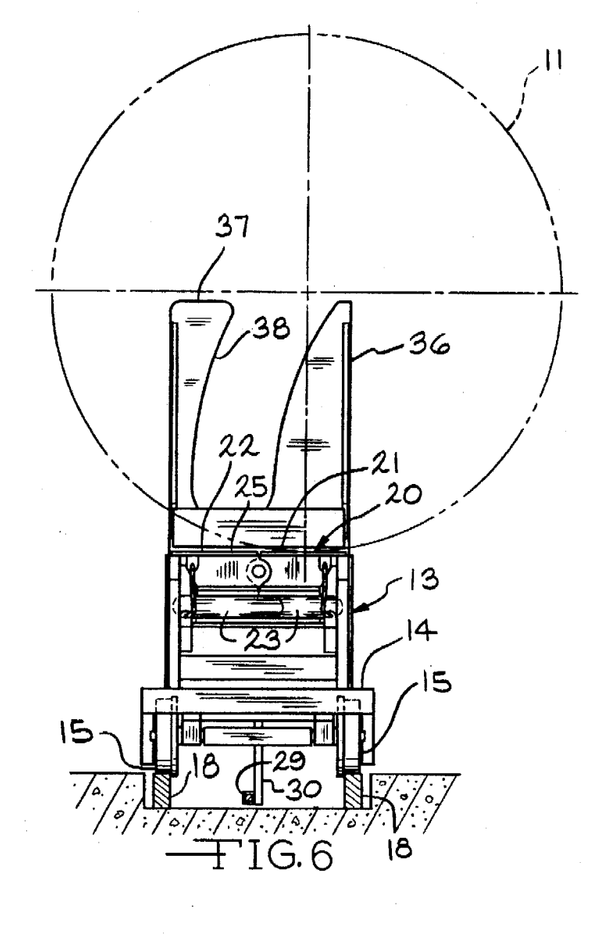
FIG. 6 is an end view of the roll handling cart shown in FIG. 4 and indicating the initial positioning of a roll by dashed lines.

A roll handling apparatus, according to the present invention, is generally indicated by the reference number 10 in FIG. 1. A plurality of rolls, in this embodiment paper rolls 11 are positioned on a roll handling cart 13 after the paper rolls 11 are discharged from a typical slitter/winder station. The roll handling cart 13 includes a base 14 which mounts wheels 15. A guide 16 directs the roll handling cart 13 along a longitudinally extending predetermined path 17. In the present embodiment, the guide 16 includes a pair of parallel guide rails 18 which mount the wheels 15 of the roll handling cart 13. The guide rails 18 are parallel to the predetermined path 17. The base 14 of the roll handling cart 13 has an upper bed 20. In the present embodiment the bed 20 includes a pair of articulated bed plates 21 and 22 which are mounted over pneumatic cushion cylinders 23. As shown in FIG. 6, when the pneumatic cushion cylinders 23 are in a first condition, the upper surface 25 of the bed 20 is generally horizontal. When the cushion cylinders are moved to a second inflated position, as shown in FIG. 7, the hinged or articulated bed plates 21 and 22 are moved to a "V" shaped position and the upper surface 25 of the bed 20 is generally "V" shaped.

Figure 7:
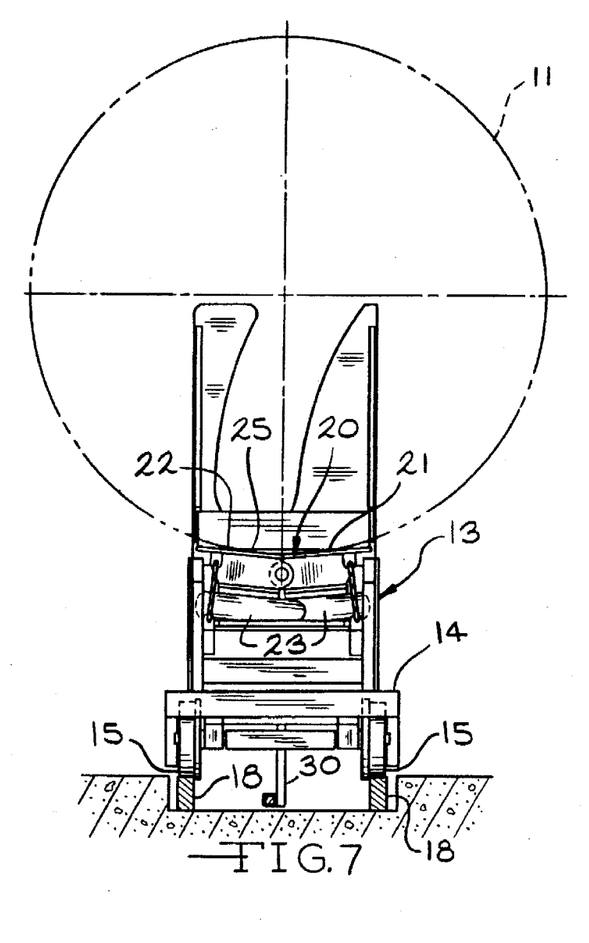
FIG. 7 is a view similar to FIG. 6 and showing a centered roll after articulated support members have moved the roll to the centered position.

Referring to FIG. 6, when a paper roll 11 is initially positioned on the bed 20 in a non-centered position, activation of the cylinders 23 and the movement of the upper surface 25 to a "V" shaped condition urges the roll 11 to move, under the force of gravity, to the centered FIG. 7 position.

Referring to FIG. 1, a drive motor 28 is mounted adjacent the guide rails 18 and powers a conveyor 29 which in the present embodiment is a continuous drive chain. Referring to FIG. 6, the roll handling cart 13 includes a depending drive arm 30 which is operatively connected to the conveyor 29. Operation of the drive motor 28 moves the roll handling cart 13 along the guide rails 18 to, for examples, cart locations 13A and 13B.

Figure 8:
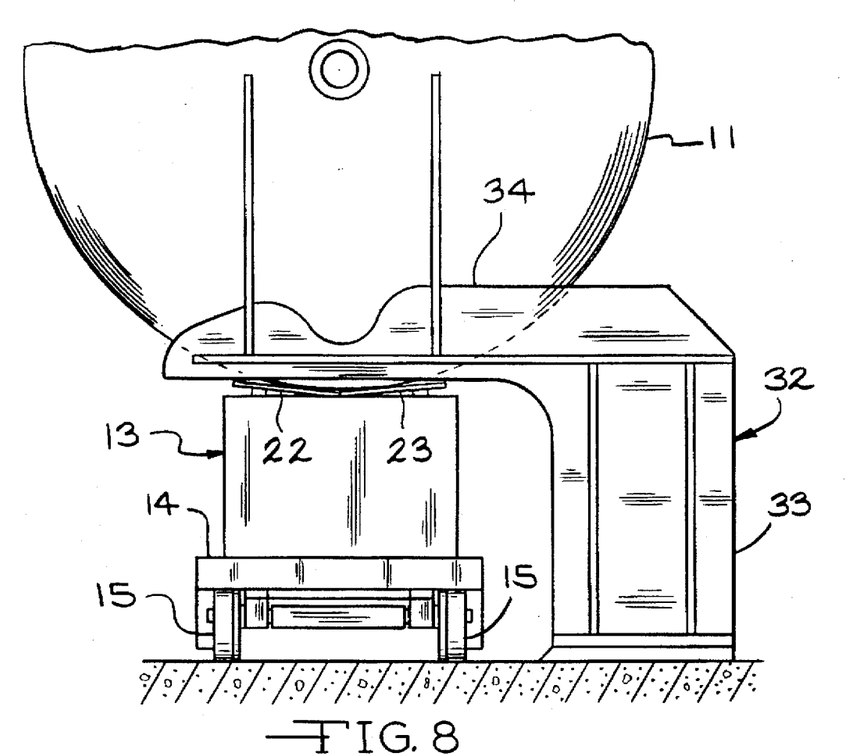
FIG. 8 is a fragmentary sectional view showing a first embodiment of the first member of the roll handling cart engaging a roll.

As shown in FIG. 1, a first member 32 is mounted adjacent the guide rails 18. In the FIG. 1 embodiment, the first member 32 includes a base 33 which mounts an engaging arm 34, as best viewed in FIG. 8.

A second member 36 is mounted in spaced relationship to the first member 32. The second member 36 comprises a stationary pusher assembly extending upwardly from the bed 20 of the roll handling cart 13. The pusher assembly includes a pusher plate 37 which is generally perpendicular to the bed 20. As shown in FIG. 6, the pusher plate 37 defines a generally vertical slotted opening 38.

Figure 2:
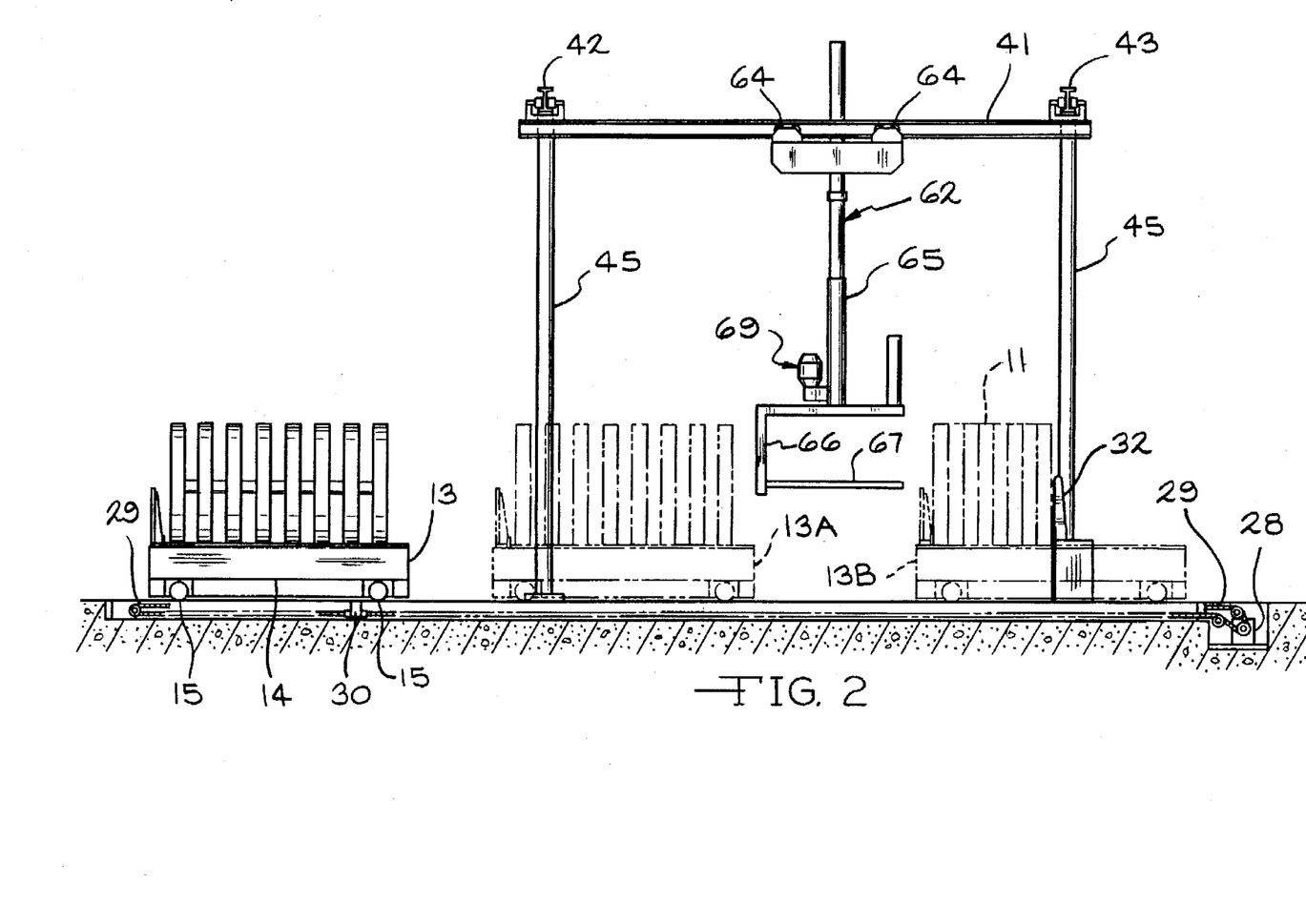
FIG. 2 is an elevational view showing a portion of the roll handling apparatus including a roll cart, according to the present invention, and showing various positions of the roll cart by dashed lines.

The first member 32 engages a first one of the plurality of spaced rolls 11 and the second member 36 engages the spaced roll at the other or opposite end from the first of the plurality of rolls 11. As the members 32 and 36 are moved relative to one another, the spaced rolls are moved toward one another into an aligned and adjacent relationship. This is best seen in FIG. 2. When the roll handling cart 13 is moved to the cart position 13B, the respective first member 32 and second member 36 engage the plurality of rolls 11 and move the rolls 11 to the aligned and roll adjacent relationship, shown at the cart position 13B.

Referring to FIG. 1, when the rolls 11 are initially positioned on the roll handling cart 13, core spacers 39 are positioned between the adjacent ones of the paper rolls 11. When the roll handling cart is moved to the position 13C the core spacers 39 are manually or otherwise removed, as indicated by the core spacer positions 39A. The paper rolls 11 are now in position to be moved adjacent to one another as shown in the roll handling cart position 13B.

Figure 9:
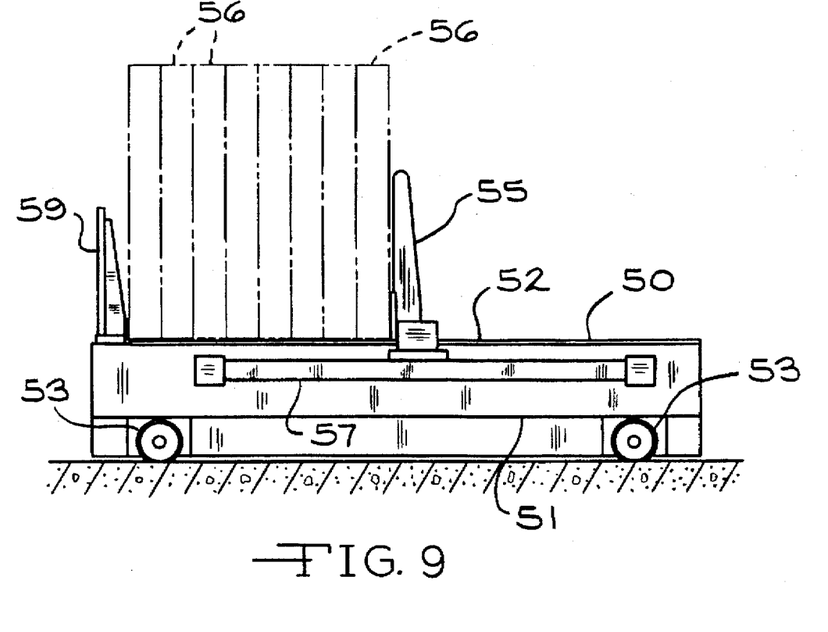
FIG. 9 is another embodiment of a roll handling cart, according to the present invention.

Referring to FIG. 9, another embodiment of a roll handling cart, according to the present invention is shown. A roll handling cart 50 has a base 51 and an articulated bed 52 similar to the roll handling cart 13. The roll handling cart 50 also includes a plurality of wheels 53 which are guided by guide members, such as rails. The roll handling cart 50 includes a first member 55 which engages the first of a plurality of paper rolls 56. The first member 55 is mounted for movement along the bed 52 and is driven by a horizontally positioned rodless cylinder 57. The rodless cylinder 57 is a prior art cylinder which is sold under the trademark "ORIGA."

In opposed relationship to the first member 55 is a stationary second member 59 mounted by the base 51. The stationary member 59 engages the opposite end of the plurality of paper rolls 56. When the first member 55 is driven by the rodless cylinder 57 toward the second member 59, the plurality of paper rolls 56 are moved to a position where each of the rolls 56 is adjacent an adjoining roll, as shown in FIG. 9.

Figure 3:
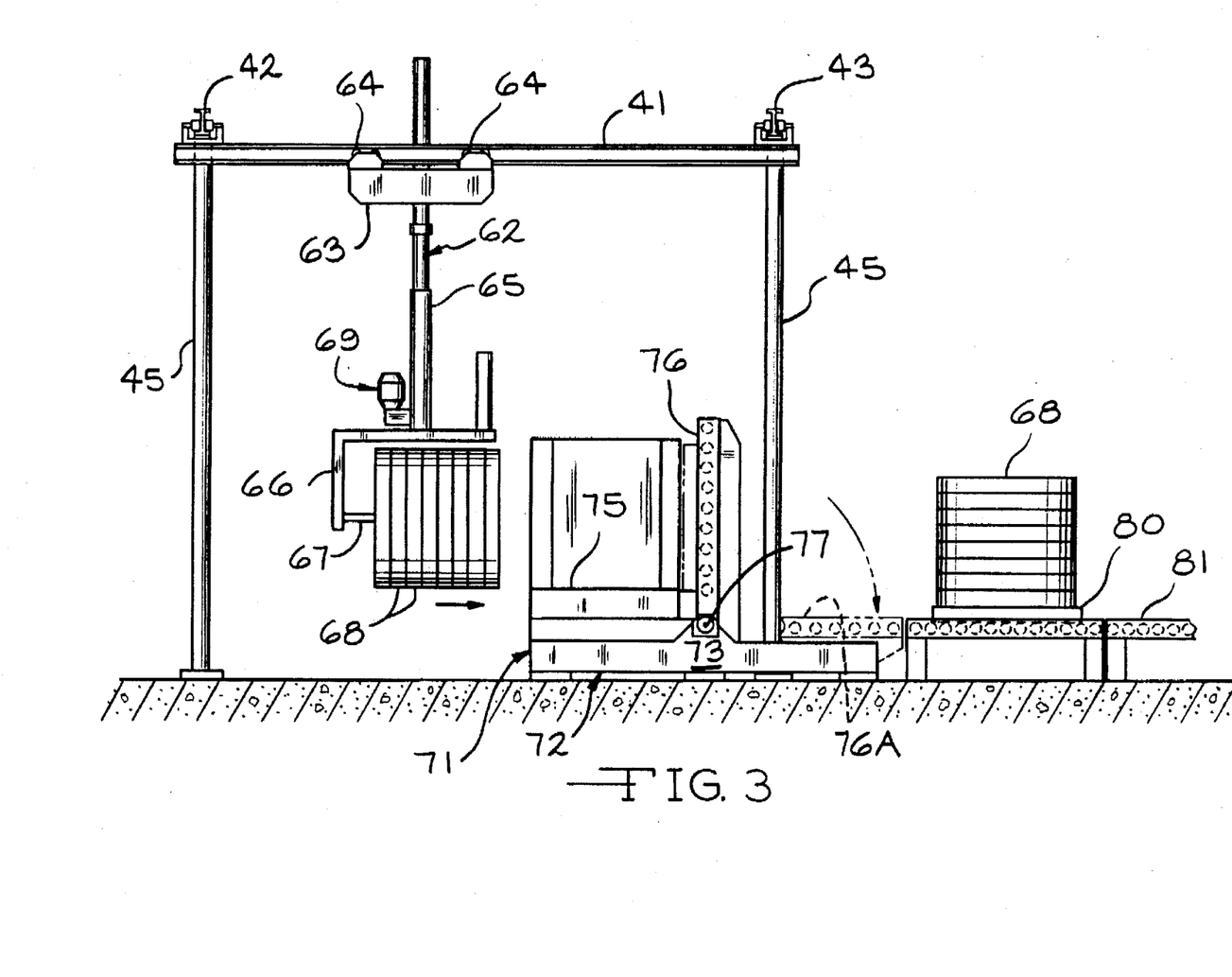
FIG. 3 is an elevational view similar to FIG. 2 showing another portion of the roll handling apparatus.
Figure 4:
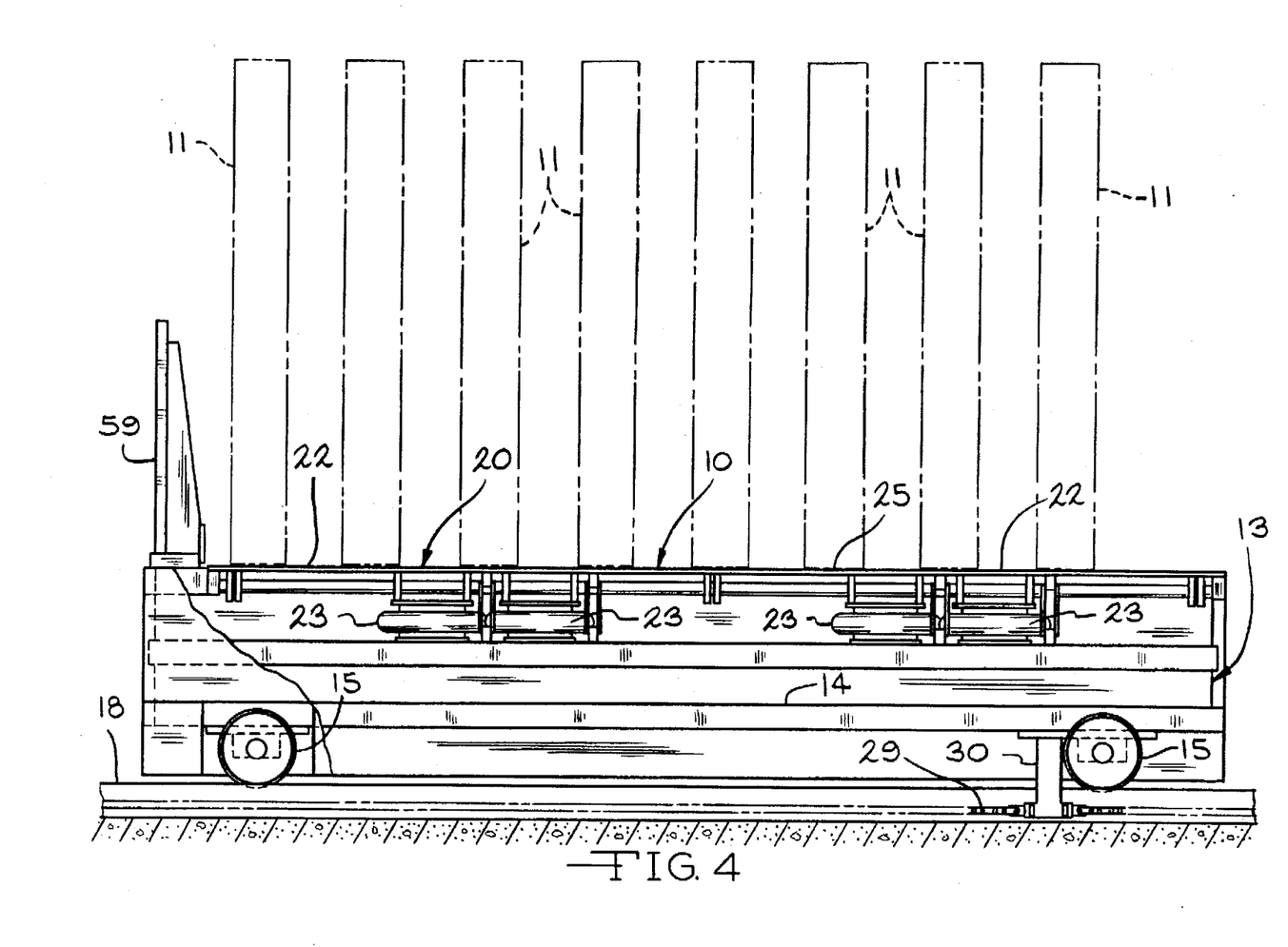
FIG. 4 is an elevational view, with parts broken away showing the roll handling cart, according to the present invention.
Figure 5:
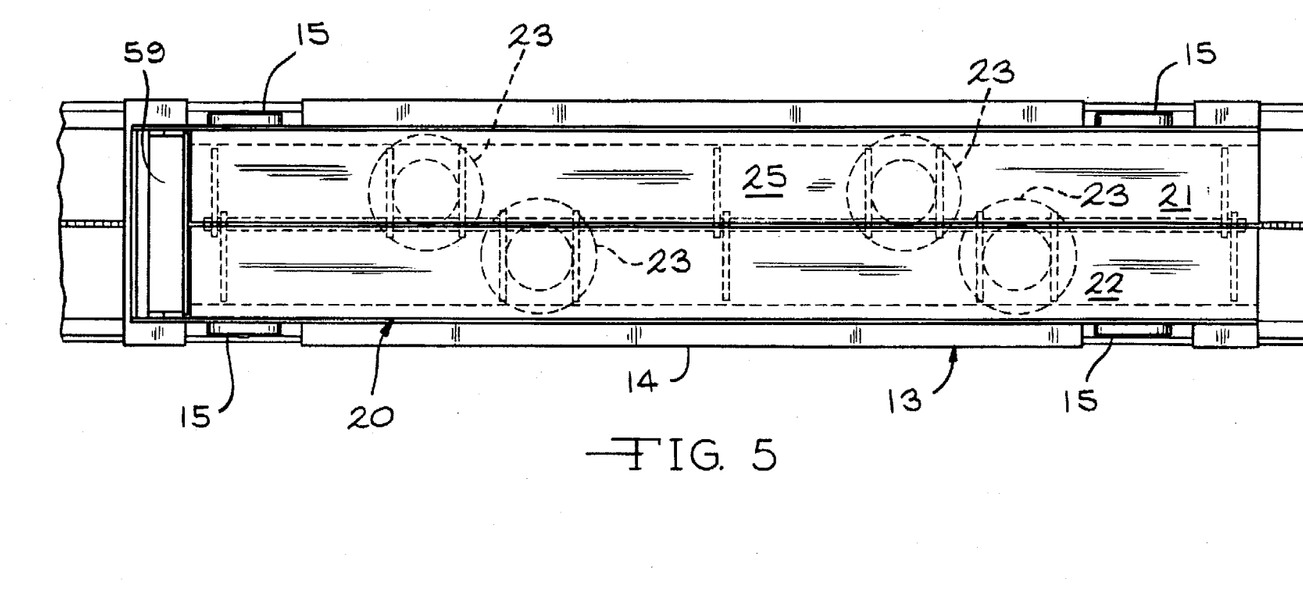
FIG. 5 is a plan view of the roll handling cart shown in FIG. 4.

Referring to FIGS. 1-3, the roll handling apparatus 10 includes an elevated support rail 41 which is parallel to the predetermined path 17 and the guide rails 18. The elevated support rail 41 is moveable along a pair of elevated guide rails 42 and 43. The rails 42 and 43 are parallel to one another and perpendicular to the elevated support rail 41. Referring to FIG. 3, the elevated guide rails 42 and 43 are supported by a plurality of vertical floor engaging posts 45.

The roll handling apparatus 10 also includes a C-hook assembly 62. The C-hook assembly 62 is of a prior art design, for example, an Automatic Handling/Bucon Levomat Unit. The hook assembly 62 includes a traveling support 63 having wheel units 64 which are carried by the elevated support rail 41. The traveling support 63 moves along the elevated support rail 41. Similarly, the traveling support 63 may be moved in a perpendicular direction when the entire elevated support rail 41 is moved along the guide rails 42 and 43.

A vertically moveable lifting arm 65 extends downwardly from the traveling support 63. A C-shaped lifting hook 66 is mounted adjacent the lower end of the lifting arm 65. The C-hook 66 includes a probe 67 which is positioned within the central openings of one of the plurality of paper rolls 68. The lifting arm 65 telescopes to move the C-hook 66 vertically and is driven by a motor drive assembly 69.

The roll handling apparatus 10 includes a tiltable upender assembly 71 which is positioned adjacent the elevated support rail 41. The C-hook assembly 62 which depends from the traveling support 63 moves the paper rolls 68 to the upender assembly 71. Referring to FIGS. 1 and 3, the upender assembly 71 includes a frame 72 having opposed side frame members 73. A deck assembly 75 is mounted above the frame 72. A rear carrier assembly 76 is connected to the deck assembly 75 and extends generally perpendicular to the deck assembly 75. The deck assembly 75 and the carrier assembly 76 are rotatable 90° relative to the frame 72 about a first axis 77. The deck assembly 75 is also tiltable about a second axis 78. The second axis 78 is substantially perpendicular to the first axis 77 as indicated in FIG. 1.

Further details of the upender assembly 71 are shown and described in my co-pending patent application Ser. No. 08/261,711, now U.S. Pat. No. 5,533,859, referred to above and incorporated herein by reference.

As the paper rolls are moved by the C-hook assembly 62, they are deposited on the deck assembly 75 of the upender assembly 71. The deck assembly 75 is then tilted around the second axis 78 to closely align the paper rolls. The deck assembly 75 and rear carrier assembly 76 are then rotated 90° around the first axis 77 to their upended position. Subsequently, the aligned rolls which are on a pallet 80 are removed to a desired location by a conveyor 81. The rotated position of the rear carrier assembly 76 is indicated in FIG. 3 by the rotated position 76A.

Referring to FIG. 1, in the present embodiment, a waste material conveyor 83 is positioned between the guide rails 18 and the upender assembly 71.

Many revisions may be made to the above-described embodiments of the roll handling apparatus 10 without departing from the scope of the invention or from the following claims.

We claim:

1. A roll handling cart comprising a bed for receiving a plurality of spaced rolls, a guide for moving said bed along a predetermined path, a first member mounted adjacent said guide for engaging a first one of said plurality of spaced rolls, a second member mounted in spaced relationship to said first member for engaging a spaced roll opposite said first one of said plurality of spaced rolls, said first member being mounted on said cart and a drive cylinder operatively connected to said first member for moving said first member into engagement with said first one of said plurality of said spaced rolls, whereby the spaced rolls are moved toward one another into an aligned and adjacent relationship.

2. A roll handling cart, according to claim 1, including articulated support members mounted on said bed, said support members having upper surfaces for supporting the rolls.

3. A roll handling cart, according to claim 2, wherein said upper surfaces of said support members are movable between a generally horizontal position and a "V" position, wherein the rolls are centered relative to said cart.

4. A roll handling cart, according to claim 3, including pneumatic cushion cylinders mounted adjacent said support members for moving said upper surfaces between the generally horizontal position and the "V" position.

5. A roll handling cart, according to claim 1, including a conveyor mounted along such predetermined path, said conveyor being operatively connected to said bed, and a driver motor operatively connected to said conveyor for moving said cart along such predetermined path.

6. A roll handling cart, according to claim 5, wherein said conveyor is a drive chain.

7. A roll handling cart, according to claim 1, wherein said second member comprises a stationary pusher assembly extending upwardly from said bed.

8. A roll handling cart, according to claim 7, wherein said pusher assembly includes a pusher plate generally perpendicular to said bed, said pusher plate defining a generally vertical slotted opening.

9. A roll handling cart, according to claim 1, wherein said cart has a plurality of wheels and said guide comprises tracks positioned parallel to such predetermined path, said wheels guided by said tracks.

10. Roll handling apparatus comprising a cart having a bed for receiving a plurality of spaced rolls, a guide for moving said bed along a predetermined path, a first member mounted adjacent said guide for engaging a first one of said plurality of spaced rolls and a second member mounted in spaced relationship to said first member for engaging a spaced roll opposite to said first one of said plurality of spaced rolls, whereby the spaced rolls are moved toward one another into an aligned and adjacent relationship, an elevated support rail mounted parallel to said guide, a C-hook assembly mounted for movement along said elevated support rail, a vertically movable lifting arm extending downwardly from said elevated support rail and a C-shaped lifting hook mounted adjacent the lower end of said lifting arm, a tiltable upender assembly adjacent said support rail, said C-shaped lifting hook supporting rolls for movement to said tiltable upender assembly, said upender assembly including a frame, a deck assembly adjacent said frame and a rear carrier assembly extending generally perpendicular to said deck assembly, said deck assembly and said rear carrier assembly being rotatable 90° relative to said frame about a first axis, said deck assembly being tiltable about a second axis, wherein the second axis is substantially perpendicular to said first axis.

* * * * *